US006694820B2

(12) United States Patent
Ono

(10) Patent No.: US 6,694,820 B2
(45) Date of Patent: Feb. 24, 2004

(54) PRESSURE SENSOR

(75) Inventor: Atsushi Ono, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/174,942

(22) Filed: Jun. 20, 2002

(65) Prior Publication Data

US 2003/0000312 A1 Jan. 2, 2003

(30) Foreign Application Priority Data

Jun. 27, 2001 (JP) .................................... P2001-194199

(51) Int. Cl.[7] .................................................. G01L 9/00
(52) U.S. Cl. ........................................................ 73/753
(58) Field of Search .......................... 73/715, 716, 717, 73/718, 719, 720, 721, 722, 723, 724, 725, 726, 727, 706, 753, 754

(56) References Cited

U.S. PATENT DOCUMENTS

| | | | | | |
|---|---|---|---|---|---|
| 4,533,604 | A | * | 8/1985 | Honda et al. | 428/521 |
| 4,970,446 | A | * | 11/1990 | Yaguchi | 318/280 |
| 5,045,829 | A | * | 9/1991 | Kuramochi et al. | 338/136 |
| 5,090,246 | A | * | 2/1992 | Colla et al. | 73/718 |
| 5,948,990 | A | * | 9/1999 | Hashida | 73/725 |

* cited by examiner

*Primary Examiner*—William Oen
(74) *Attorney, Agent, or Firm*—Whitham, Curtis & Christofferson, P.C.

(57) ABSTRACT

In a pressure sensor, a first electrode is formed on a base plate. A insulating laminate material coats the first electrode. A conductive rubber is attached on a click rubber. The conductive rubber is brought into a pressure contact with the first electrode coated with the insulating laminate material.

6 Claims, 4 Drawing Sheets

PRESSURE SENSOR

BACKGROUND OF THE INVENTION

The present invention relates to a pressure sensor, and more particularly to a sensor electrode coated with an insulating body on a base plate, in which the dispersion in a coating thickness of the insulating body is decreased.

Referring to FIGS. 3 to 6, a related sensor of this type will be described below. In FIG. 3, a switch device 1 includes a pair of first electrodes 3 mounted on a base plate 2, and a C-shaped second electrode 4 which is circumferentially arranged around the first electrodes 3 so as to be outwardly apart therefrom as shown in FIG. 4. The first electrodes 3 and the second electrode 4 are covered with a resist 5, and a pair of carbon electrodes 6 are provided on an upper face of the resist 5 and above the first electrodes 3.

Moreover, there is provided a click rubber 7 above and opposed to the first electrodes 3 and the second electrode 4. The click rubber 7 has a substantially cylindrical body 8 and a flexible leg 9 extending downwardly from an outer peripheral part of the cylindrical body 8 at a lower end thereof. In addition, a conductive rubber 10 substantially in a disc-like shape is provided in a center part of the lower end of the cylindrical body 8. The conductive rubber 10, the first electrodes 3 and the second electrode 4 constitute an electrostatic capacitance sensor 13.

Further, a button 11 is mounted on an upper face of the click rubber 7. An upper cover 12 for covering an upper part of the click rubber 7, the first electrodes 3 and the second electrode 4 is provided to press down at a bottom parts 9*a* of the flexible leg 9 of the click rubber 7, so that an upper part of the button 11 is projected through an opening 12*a* which is formed in an upper part of the upper cover 12.

FIG. 5 shows a sensor circuit 14 of the switch device 1. The sensor circuit 14 includes a resistor 16 for setting a resistance constant connected to a line extending from a clock power source 15, and the resistor 16 is connected to one of input terminals of the Exclusive OR gate 17. Then, an end of the sensor 13 is connected to the line between the resistor 16 and the Exclusive-OR gate 17. The sensor 13 is composed of a capacitor 18 and a switch 19 connected in series, and the other end of the sensor 13 is grounded.

On the other hand a resistor 20 for setting a resistance constant os connected to another line extending from the clock power source 15, and the resistor 20 is connected to the other input terminal of the Exclusive-OR gate 17.

In this state, the capacitor 18 corresponds to a circuit constituted by the conductive rubber 10, the first electrodes 3 and the second electrode 4, while the switch 19 corresponds to a circuit constituted by the conductive rubber 10 and the carbon electrodes 6.

Incidentally, when the button 11 is depressed, the flexible leg 9 of the click rubber 7 is flexed so that the conductive rubber 10 of the click rubber 7 is brought into contact with the carbon electrodes 6 to establish electrical connection between the carbon electrodes. As the button 11 continues to be pushed down, the conductive rubber 10 is pushed against the first electrodes 3 and the second electrode 4 which is covered with the resist 5. According to the pressure contact, electrostatic capacitance in the conductive rubber 10 is varied so that output from the conductive rubber 10 is thereby changed.

In other words, after the switch 19 is turned on in the circuit 14, the output of the Exclusive-OR gate 17 is changed in accordance with the variation of the electrostatic capacitance of the capacitory 18.

FIG. 6 is a graph showing the relationship between pressure of the sensor provided by bringing the conductive rubber 10 into contact with the resist 5 and the output level therefrom. As shown by a solid line, the output level rises substantially in proportion to a rise of the pressure.

Howerver, in FIG. 6, there exists disersio0n in the output level for the pressure of the respective sensors 13 as shown by dotte lines. The dispersion may incur instability of the output level for the pressure of the sensor 13 so that reliabilty as the sensor 13 may be deteriorated.

It is considered that dispersion in a coating thickness of the resist 5 covering the first electrodes 3 and the second electrode 4 is one of the causes of the dispersion in the output level for the pressure. In fact, when the resist 5 having a coating thickness of 10 $\mu$m are resist-printed on copper patters of the first electrodes 3 and second electrode 4, a coating thickness of the printed resist 5 will be 8 $\mu$m to 16 $\mu$m, and the dispersion in the output level for the pressure will occur.

SUMMARY OF THE INVENTION

It is therefore an object of the present invention to provide a pressure sensor in which the dispersion in the output level for the pressure of the pressure sensor is decreased.

In order to achieve the above object, according to the present invention, there is provided a pressure sensor comprising:

- a base plate;
- a first electrode, formed on the base plate;
- a insulating laminate material, which coats the first electrode;
- a conductive rubber; and
- a click rubber, on which the conductive rubber is attached, for bringing the conductive rubber into a pressure contact with the first electrode coated with the insulating laminate material.

Preferably, a coating thickness of the insulating laminate material is substantially constant.

Preferably, the first electrode is formed into a C-shape in a plane view.

In this configurations, the dispersion in the output level for the pressure of the pressure sensor can be decreased.

BRIEF DESCRIPTION OF THE DRAWINGS

The above objects and advantages of the present invention will become more apparent by describing in detail preferred exemplary embodiments thereof with reference to the accompanying drawings, wherein:

Preferred embodiments of the present invention will be described below in detail referring to FIGS. 1A, 1B and 2. For convenience of explanation, same components as in the related switch device will be denoted with same reference numerals, and their explanation will be omitted. In FIGS. 1A and 1B, a sensor electrode 21 according to the present invention includes a C-shaped electrode 22 which is coated with insulating laminate material 23. Then, the electrode 22 coated with the insulating laminate material 23 is fixed to the base plate 2, and a lead line 24 of the electrode 22 is projected from an outer edge of the insulating laminate material 23. An end of the projected lead line 24 is connected to a land 25 on the base plate 2.

Figure 3:
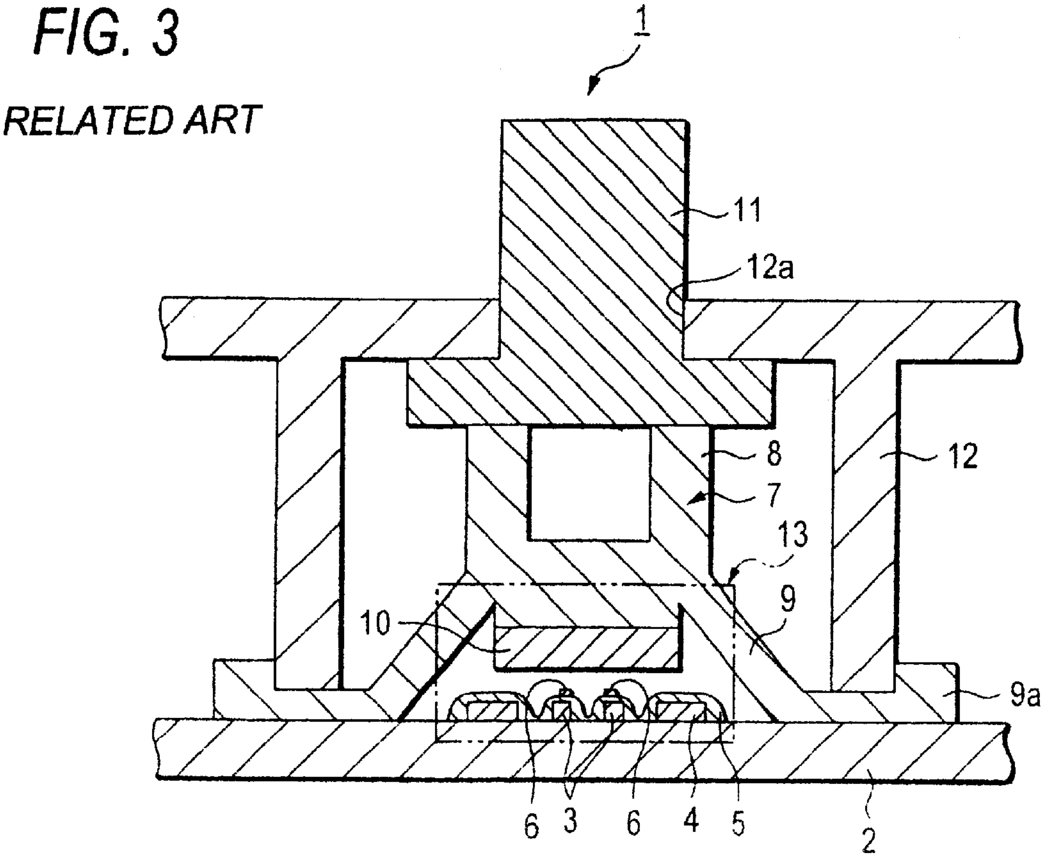
FIG. 3 RELATED ART
FIG. 3 is a vertical sectional view of a related switch device.
Figure 4:
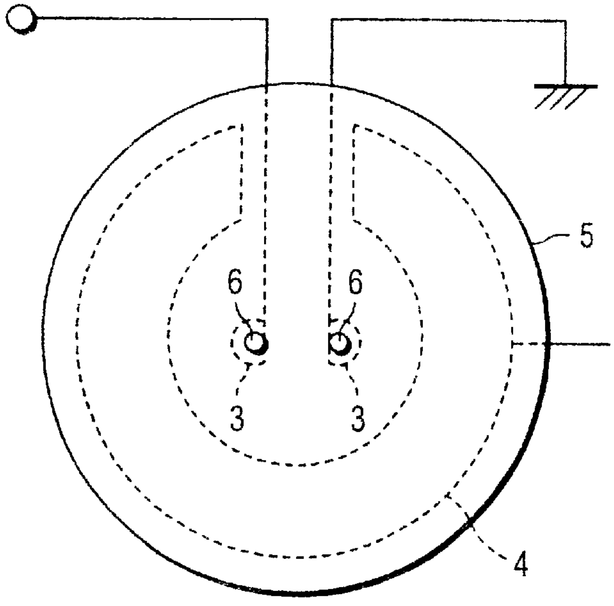
FIG. 4 RELATED ART
FIG. 4 is a plan view of a sensor electrode in the related switch device.
Figure 5:
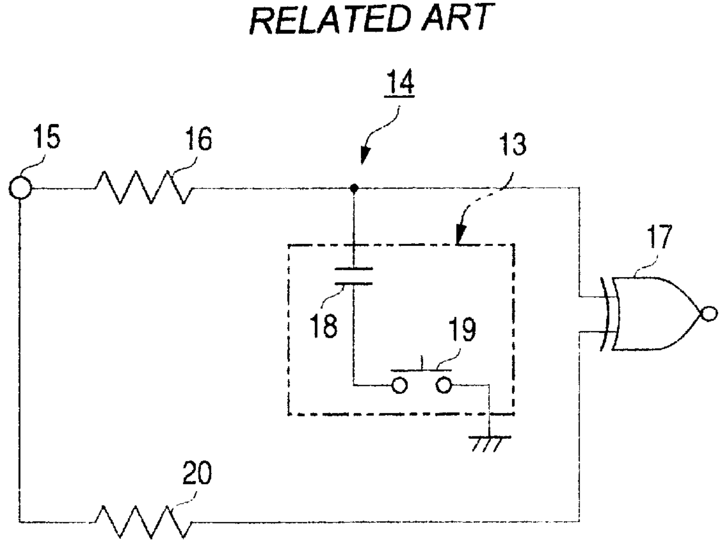
FIG. 5 RELATED ART
FIG. 5 is a circuit diagram of a sensor in the related switch device.
Figure 6:
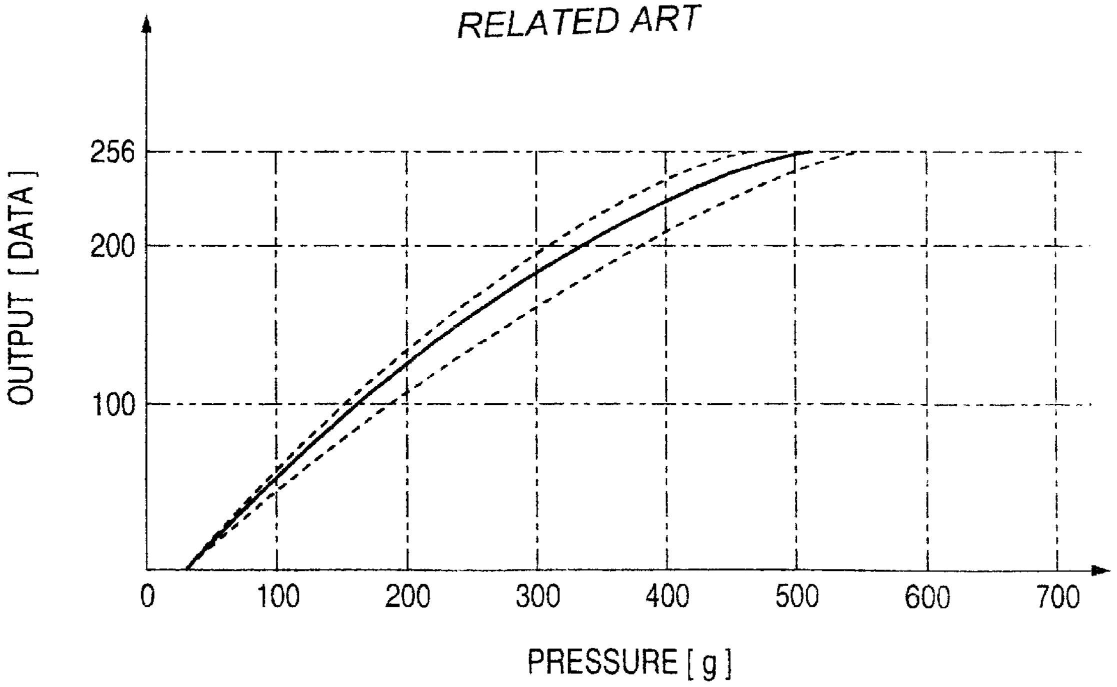
FIG. 6 RELATED ART
FIG. 6 is a graph showing relationship between pressure and output of the related switch device.

For example, a sheet made of the insulating laminate material having a film thickness of 10 $\mu$m has an accuracy in film thickness of 10 $\mu$m±0.001 $\mu$m, and when the insulating laminate material 23 is used, an accuracy of the coating thickness will be extremely high as compared with the resist 5 of the related switch device shown in FIG. 3. Also, for example, the insulating laminate material 23 is constituted of a plastic material.

Figure 1A:
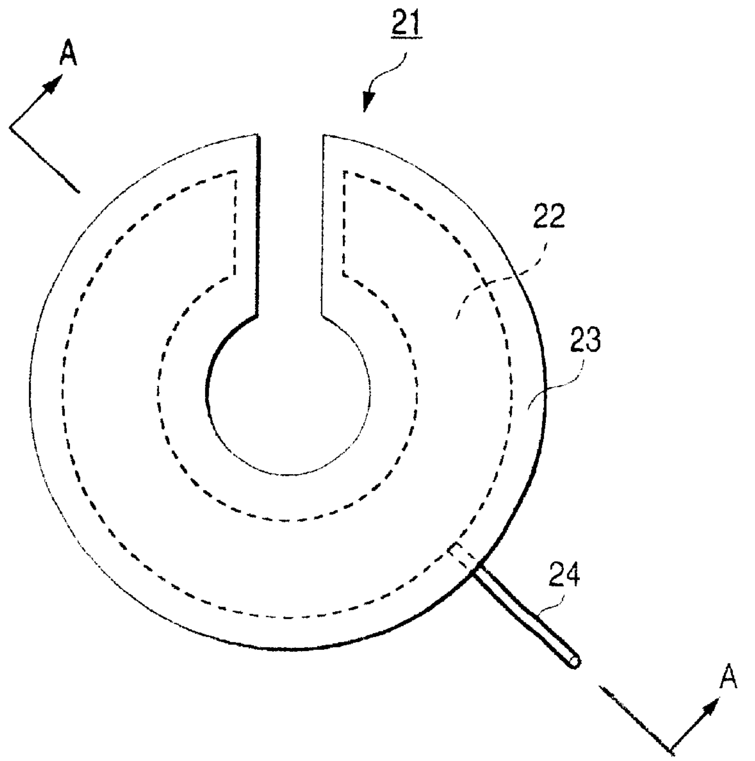
FIG. 1A is a plan view of a sensor electrode according to one embodiment of the present invention.
Figure 1B:
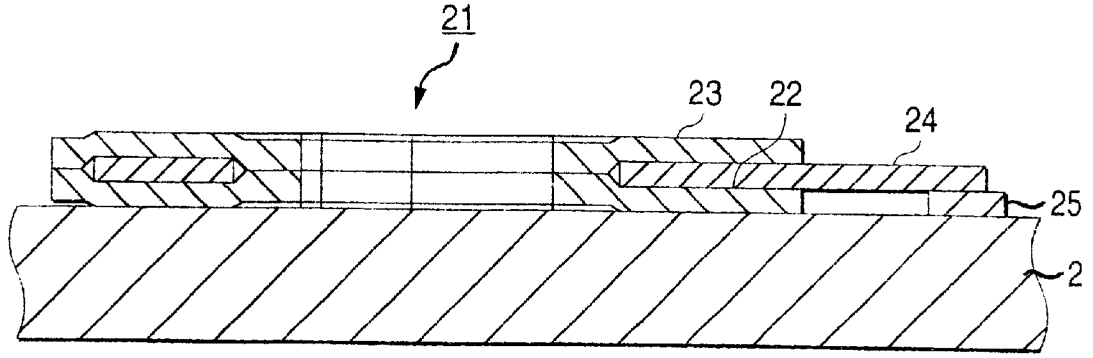
FIG. 1B is a sectional view taken along a line A—A of FIG. 1A.
Figure 2:
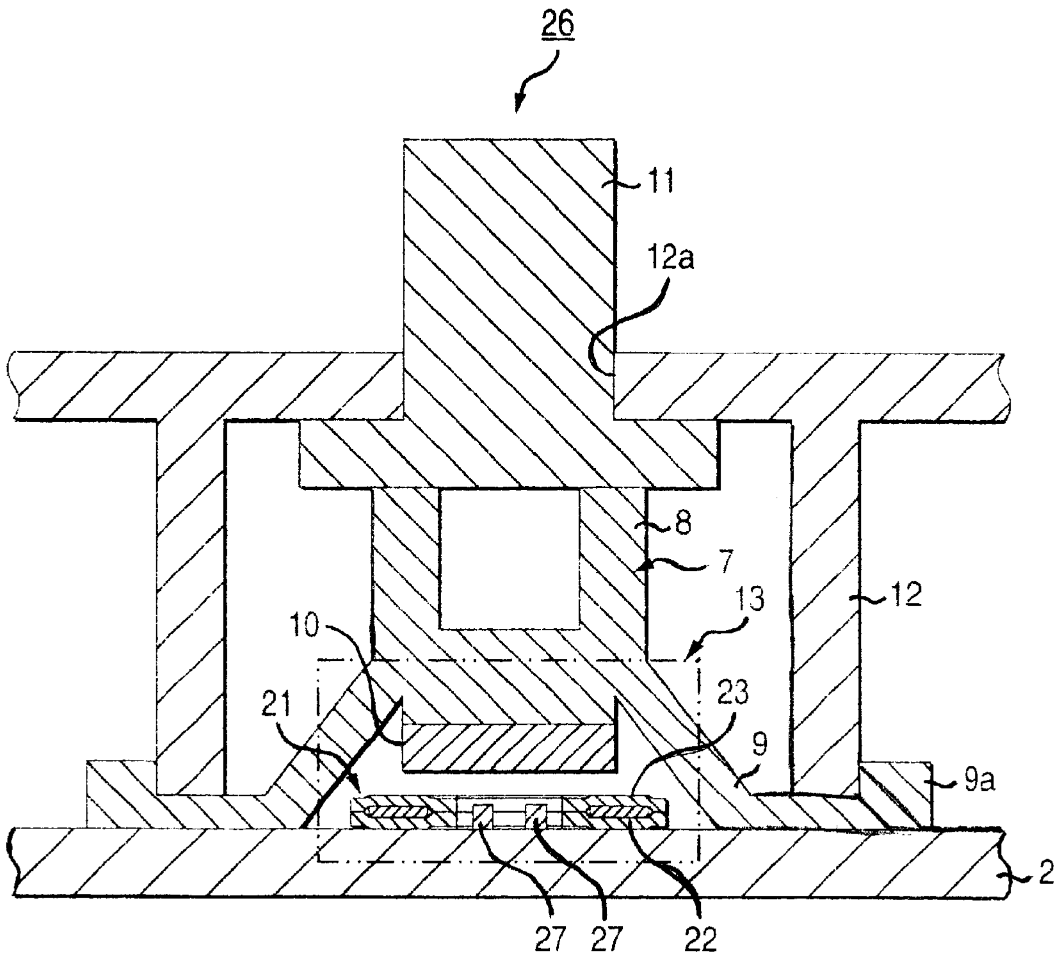
FIG. 2 is a vertical sectional view of a switch device according to the one embodiment of the present invention.

FIG. 2 shows one embodiment in which the sensor electrode 21 is applied to a switch device 26. In the switch device 26, in place of the first electrodes 3, the second electrode 4, the carbon electrodes 6, and the resist 5 of the related switch device 1 shown in FIG. 3, the sensor electrode 21 is mounted on the base plate 2, and central electrodes 27 are provided in a center part of the sensor electrode 21. The central electrodes 27 and the conductive rubber 10 constitute a switch, while the sensor electrode 22 and the conductive rubber 10 constitute a capacitor.

Incidentally, in the switch device 26, when the button 11 is depressed, the flexible leg 9 of the click rubber 7 is flexed so that the conductive rubber 10 of the click rubber 7 is brought into contact with the central electrodes 27 to establish electrical continuity between the central electrodes 27. As the button 11 continues to be pushed down, the conductive rubber 10 is pushed against the electrode 22 coated with the insulating laminate material 23. According to the pressure contact, the electrostatic capacitance in the conductive rubber 10 is varied so that the output from the conductive rubber 10 is thereby changed.

In this manner, because the electrode 22 of the sensor electrode 21 is coated with the insulating laminate material 23, the coating thickness of the insulating laminate material 23 can be made substantially constant so that the dispersion in the output level for the pressure of the sensor can be decreased.

It is to be noted that various modifications can be made in the present invention unless they deviate from the spirit of the present invention, and it is apparent that the present invention covers also the modifications.

What is claimed is:

1. A pressure sensor, comprising:

a base plate;

a first electrode positioned on the base plate;

an insulating laminate material coated on top and bottom surfaces of the first electrode;

a conductive rubber; and a click rubber, on which the conductive rubber is attached, for bringing the conductive rubber into a pressure contact with the first electrode coated with the insulating laminate material.

2. The pressure sensor as set forth in claim 1, wherein a coating thickness of the insulating laminate material is substantially constant.

3. The pressure sensor as set forth in claim 1, wherein the first electrode is formed into a C-shape in a plane view.

4. The pressure sensor of claim 3 further comprising central electrodes formed on said base plate in a center section of said C-shape.

5. A pressure sensor, comprising:

a base plate;

central electrodes formed on the base plate;

a sensor electrode coated with a laminate insulating material surrounding said central electrodes and positioned on the base plate;

a conductive rubber; and a click rubber, on which the conductive rubber is attached, for bringing the conductive rubber into a pressure contact with the central electrodes and the sensor electrode coated with the insulating laminate material.

6. The pressure sensor of claim 5 wherein said sensor electrode has a C-shape.

* * * * *